(12) United States Patent
Ningrat et al.

(10) Patent No.: US 11,301,097 B2
(45) Date of Patent: *Apr. 12, 2022

(54) TECHNIQUES FOR USING A TOUCH SCREEN TO PERFORM EAR DETECTION USING EMULATED SELF CAPACITANCE SENSING

(71) Applicant: STMicroelectronics Asia Pacific Pte Ltd, Singapore (SG)

(72) Inventors: Kusuma Adi Ningrat, Singapore (SG); Cam Chung La, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,317

(22) Filed: Apr. 14, 2021

(65) Prior Publication Data

US 2021/0382576 A1 Dec. 9, 2021

Related U.S. Application Data

(63) Continuation of application No. 16/893,672, filed on Jun. 5, 2020, now Pat. No. 11,003,294.

(51) Int. Cl.
*G06F 3/044* (2006.01)
*G06F 3/0488* (2013.01)
*G06F 3/041* (2006.01)
*G06F 3/04883* (2022.01)

(52) U.S. Cl.
CPC ........ *G06F 3/0443* (2019.05); *G06F 3/04164* (2019.05); *G06F 3/04166* (2019.05); *G06F 3/04883* (2013.01)

(58) Field of Classification Search
CPC .......... G06F 3/0443; G06F 3/04166–041662; G06F 3/04164; G06F 3/04883
See application file for complete search history.

(56) References Cited

U.S. PATENT DOCUMENTS

| 10,126,883 | B2 | 11/2018 | Coulson et al. |
| 10,289,235 | B2 | 5/2019 | King et al. |
| 2018/0157371 | A1 | 6/2018 | Harrison et al. |
| 2019/0050079 | A1 | 2/2019 | Wang et al. |
| 2019/0294275 | A1 | 9/2019 | Ko et al. |

FOREIGN PATENT DOCUMENTS

WO 2015048583 A1 4/2015

*Primary Examiner* — Michael Pervan
(74) *Attorney, Agent, or Firm* — Crowe & Dunlevy

(57) ABSTRACT

A touch-screen-controller (TSC) performs mutual sensing to acquire touch strength values from a touch matrix formed by capacitively intersecting conductive lines. For each line, the TSC generates an emulated self capacitance value from an associated touch strength value based upon a position of that line compared to a location on the touch matrix adjacent to which a first touch type is expected to occur, and determines presence of the first touch type adjacent to the touch matrix based upon the emulated values. The emulated values for each conductive line may be weighted based upon its closeness to the location where the first touch type is expected to occur. The weighting may be zero if its associated conductive line is outside of the location where the first touch type is expected to occur, and may be one if inside of the location where the first touch type is expected to occur.

21 Claims, 4 Drawing Sheets

TECHNIQUES FOR USING A TOUCH SCREEN TO PERFORM EAR DETECTION USING EMULATED SELF CAPACITANCE SENSING

RELATED APPLICATION

This application is a continuation of U.S. application for patent Ser. No. 16/893,672, filed Jun. 5, 2020, the contents of which are incorporated by reference to the maximum extent allowable under the law.

TECHNICAL FIELD

This disclosure is related to the field of capacitive touch sensing and, in particular, to the emulation of self capacitance sensing, using touch data collected with mutual capacitance sensing, to perform accurate ear detection.

BACKGROUND

Touch screens are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

Two common capacitive touch sensing modes that may be performed on touch screens are mutual capacitance sensing and self capacitance sensing. In a mutual self capacitance sensing mode, a drive signal is applied to a subset of the lines referred to as drive lines, and capacitance values are measured at a subset of the lines referred to as sense lines, with it being understood that the sense lines cross the drive lines in a spaced apart fashion therefrom. Each crossing of a drive line and a sense line forms a capacitive node. Since bringing a finger or conductive stylus near the surface of the touch screen changes the local electric field, this causes a reduction in the capacitance between the drive lines and the sense lines (the "mutual" capacitance), and the capacitance change at every individual capacitive node can be measured and processed to accurately determine the touch location. Therefore, the output of mutual capacitance sensing is a two-dimensional matrix of values, with one value for each capacitive node (crossing between a drive line and a sense line). Thus, it can be appreciated that mutual capacitance sensing allows multi-touch operation where multiple fingers, palms or styli can be accurately tracked at the same time.

In a self capacitance sensing mode, the drive signal is applied to every line, regardless of orientation. Bringing a finger or conductive stylus near the surface of the sensor changes the local electric field, increasing the capacitance between the drive line or sense line of interest and ground (the "self capacitance") in this instance. However, since all lines are driven, the capacitance change can only be measured on each line. Therefore, the output of self capacitance sensing is two one dimensional arrays of values, with one value for each line.

There is an increasing demand for smartphones having a touch screen that spans across the full front side of the smartphone, without large cutouts or large bezels permitting the presence of numerous sensors on the front side of the smartphone. In particular, it is desired to remove proximity sensors from the front side of smartphones, and to instead utilize the touch screen itself to perform the function of a proximity sensor (which is used by the smartphone to determine when the user is holding the smartphone next to their ear to make a voice call).

While conventional touch screens may be capable of performing the function of a proximity sensor when operating using self capacitance sensing, issues arise when it is desired to make a particularly thin touch screen perform the function of a proximity sensor. For example, in thin touch screen technology, the touch sensors themselves become more influenced by and exposed to display noise, resulting in signal to noise ratio too poor to utilize self capacitance sensing in performing the function of a proximity sensor. As such, further development is needed.

SUMMARY

Disclosed herein is a touch screen controller including processing circuitry. The processing circuitry is configured to perform mutual capacitance sensing to acquire touch strength values from a capacitive touch matrix formed by capacitively intersecting drive lines and sense lines, and for each sense line, sum the touch strength values associated with that sense line to thereby form an emulated self capacitance sense value for that sense line, and apply a weighting to that emulated self capacitance sense value, the weighting being based upon a position of that sense line compared to a location on the capacitive touch matrix adjacent which a user's ear is expected to be placed. For each drive line, the processing circuitry is further configured to sum the touch strength values associated with that drive line to thereby form an emulated self capacitance drive value for that drive line, and apply a weighting to that emulated self capacitance drive value, the weighting being based upon a position of that drive line compared to the location on the capacitive touch matrix adjacent which the user's ear is expected to be placed. The processing circuitry is also configured to determine presence of the user's ear adjacent to the capacitive touch matrix based upon the emulated self capacitance sense values and the emulated self capacitance drive values.

The weighting of each emulated self capacitance sense value may be greater the closer its associated sense line is to the location on the capacitive touch matrix adjacent which the user's ear is expected to be placed and lesser the farther its associated sense line is from the location on the capacitive touch matrix adjacent which the user's ear is expected to be placed. The weighting of each emulated self capacitance drive value may be greater the closer its associated drive line is to the location on the capacitive touch matrix adjacent which the user's ear is expected to be placed and lesser the farther its associated drive line is from the location on the capacitive touch matrix adjacent which the user's ear is expected to be placed.

The weighting of each emulated self capacitance sense value may be a weighting of zero if its associated sense line is outside of the location on the capacitive touch matrix adjacent which the user's ear is expected to be placed, and a weighting of one if its associated sense line is inside of the location on the capacitive touch matrix adjacent which the user's ear is expected to be placed. The weighting of each emulated self capacitance drive value may be a weighting of zero if its associated drive line is outside of the location on the capacitive touch matrix adjacent which the user's ear is expected to be placed, and a weighting of one if its associated drive line is inside of the location on the capacitive touch matrix adjacent which the user's ear is expected to be placed.

The weighting of each emulated self capacitance sense value may be a weighting of zero if its associated sense line is inside of a location on the capacitive touch matrix adjacent which the user's hand is expected to be placed. The weighting of each emulated self capacitance drive value may be a weighting of zero if its associated sense line is inside of a location on the capacitive touch matrix adjacent which the user's hand is expected to be placed.

Also disclosed herein is a smartphone including a portable housing, and a touch screen carried by the portable housing on a front face thereof, with the touch screen including a capacitive touch matrix formed by capacitively intersecting drive lines and sense lines. A speaker is carried by the portable housing at a top of the front face. A touch screen controller within the portable housing includes drive circuitry configured to apply a drive signal to the drive lines, sense circuitry configured to sense mutual capacitances between the capacitive intersections of the drive lines and the sense lines, and processing circuitry. The processing circuitry is configured to acquire touch strength values from the sense lines while the drive signal is applied to the drive lines, and for each sense line, sum the touch strength values associated with that sense line to thereby form an emulated self capacitance sense value for that sense line, and apply a weighting to that emulated self capacitance sense value, the weighting being based upon a position of that sense line on the front face of the portable housing compared to the position of the speaker on the front face of the portable housing. The processing circuitry is also configured to, for each drive line, sum the touch strength values associated with that drive line to thereby form an emulated self capacitance drive value for that drive line, and apply a weighting to that emulated self capacitance drive value, the weighting being based upon a position of that drive line on the front face of the portable housing compared to the position of the speaker on the front face of the portable housing. The processing circuitry also determines presence of the user's ear adjacent to the capacitive touch matrix based upon the emulated self capacitance sense values and the emulated self capacitance drive values.

The weighting of each emulated self capacitance sense value may be greater the closer its associated sense line is to the position of that sense line on the front face of the portable housing and lesser the farther its associated sense line is from the position of the speaker on the front face of the portable housing. The weighting of each emulated self capacitance drive value may be greater the closer its associated drive line is to the location on the capacitive touch matrix adjacent which the user's ear is expected to be placed and lesser the farther its associated drive line is from the position of the speaker on the front face of the portable housing.

The weighting of each emulated self capacitance sense value may be a weighting of zero if its associated sense line is outside of a zone defined around the speaker, and a weighting of one if its associated sense line is inside of the zone defined around the speaker.

The weighting of each emulated self capacitance sense value may be a weighting of zero if its associated sense line is inside of a location on the capacitive touch matrix adjacent which the user's hand is expected to be placed. The weighting of each emulated self capacitance drive value may be a weighting of zero if its associated sense line is inside of a location on the capacitive touch matrix adjacent which the user's hand is expected to be placed.

Also disclosed herein is a method including acquiring touch strength values from a capacitive touch matrix formed by capacitively intersecting drive lines and sense lines, using mutual capacitance sensing, and for each sense line, summing the touch strength values associated with that sense line to thereby form an emulated self capacitance sense value for that sense line, and apply a weighting to that emulated self capacitance sense value, the weighting being based upon the position of that sense line compared to a location on the capacitive touch matrix adjacent which a user's ear is expected to be placed. The method also includes for each drive line, summing the touch strength values associated with that drive line to thereby form an emulated self capacitance drive value for that drive line, and apply a weighting to that emulated self capacitance drive value, the weighting being based upon the position of that drive line compared to the location on the capacitive touch matrix adjacent which the user's ear is expected to be placed. The method further includes determining presence of the user's ear adjacent to the capacitive touch matrix based upon the emulated self capacitance sense values and the emulated self capacitance drive values.

The weighting of each emulated self capacitance sense value may be greater the closer its associated sense line is to the location on the capacitive touch matrix adjacent which the user's ear is expected to be placed and lesser the farther its associated sense line is from the location on the capacitive touch matrix adjacent which the user's ear is expected to be placed. The weighting of each emulated self capacitance drive value may be greater the closer its associated drive line is to the location on the capacitive touch matrix adjacent which the user's ear is expected to be placed and lesser the farther its associated drive line is from the location on the capacitive touch matrix adjacent which the user's ear is expected to be placed.

The weighting of each emulated self capacitance sense value may be a weighting of zero if its associated sense line is outside of the location on the capacitive touch matrix adjacent which the user's ear is expected to be placed, and a weighting of one if its associated sense line is inside of the location on the capacitive touch matrix adjacent which the user's ear is expected to be placed. The weighting of each emulated self capacitance drive value may be a weighting of zero if its associated drive line is outside of the location on the capacitive touch matrix adjacent which the user's ear is expected to be placed, and a weighting of one if its associated drive line is inside of the location on the capacitive touch matrix adjacent which the user's ear is expected to be placed.

The weighting of each emulated self capacitance sense value may be a weighting of zero if its associated sense line is inside of a location on the capacitive touch matrix adjacent which the user's hand is expected to be placed. The weighting of each emulated self capacitance drive value may be a weighting of zero if its associated sense line is inside of a location on the capacitive touch matrix adjacent which the user's hand is expected to be placed.

Also disclosed herein is a touch screen controller, including processing circuitry configured to perform mutual capacitance sensing to acquire touch strength values from a capacitive touch matrix formed by capacitively intersecting conductive lines, for each conductive line, generate an emulated self capacitance value from an associated touch strength value based upon a position of that conductive line compared to a location on the capacitive touch matrix adjacent to which a first touch type is expected to occur, and determine presence of the first touch type adjacent to the capacitive touch matrix based upon the emulated self capacitance values.

The processing circuitry may be configured to generate the emulated self capacitance values for each conductive line by weighting the acquired touch strength values based upon its closeness to the location on the capacitive touch matrix adjacent to which the first touch type is expected to occur.

The weighting applied to each acquired touch strength value may be a weighting of zero if its associated conductive line is outside of the location on the capacitive touch matrix adjacent which the first touch type is expected to occur, and a weighting of one if its associated conductive line is inside of the location on the capacitive touch matrix adjacent which the first touch type is expected to occur.

The weighting applied to each acquired touch strength value may be a weighting of one if its associated conductive line is outside of the location on the capacitive touch matrix adjacent which a second touch type is expected to occur, and a weighting of zero if its associated conductive line is inside of the location on the capacitive touch matrix adjacent which the first touch type is expected to occur, wherein the second touch type is different than the first touch type.

The first touch type may be a touch by a portion of a user's head, and the second touch type may be a touch by a portion of a user's hand.

The conductive lines may include capacitively intersecting drive lines and sense lines. The processing circuitry may be configured to generate the emulated self capacitance value for each conductive line by for each sense line, generating an emulated self capacitance sense value based upon a position of that sense line compared to a location on the capacitive touch matrix adjacent to which the first touch type is expected to occur, and for each drive line, generate an emulated self capacitance drive value based upon a position of that drive line compared to the location on the capacitive touch matrix adjacent to which the first touch type is expected to occur. The processing circuitry may be configured to determine the presence of the first touch type adjacent to the capacitive touch matrix based upon the emulated self capacitance sense values and emulated self capacitance drive values.

The processing circuitry may be configured to generate the emulated self capacitance sense values by acquiring touch strength values for the sense lines and weighting those touch strength values based on their closeness to the location on the capacitive touch matrix adjacent to which the first touch type is expected to occur. The processing circuitry may be configured to generate the emulated self capacitance drive values by acquiring touch strength values for the drive lines and weighting those touch strength values based on their closeness to the location on the capacitive touch matrix adjacent to which the first touch type is expected to occur.

The weighting applied to each touch strength value for the sense lines may be a weighting of zero if its associated sense line is outside of the location on the capacitive touch matrix adjacent which the first touch type is expected to occur, and a weighting of one if its associated sense line is inside of the location on the capacitive touch matrix adjacent which the first touch type is expected to occur.

The weighting applied to each touch strength value for the drive lines may be a weighting of zero if its associated drive line is outside of the location on the capacitive touch matrix adjacent which the first touch type is expected to occur, and a weighting of one if its associated drive line is inside of the location on the capacitive touch matrix adjacent which the first touch type is expected to occur.

The weighting applied to each touch strength value for the sense lines may be a weighting of one if its associated sense line is outside of the location on the capacitive touch matrix adjacent which a second touch type is expected to occur, and a weighting of zero if its associated sense line is inside of the location on the capacitive touch matrix adjacent which the second touch type is expected to occur.

The weighting applied to each touch strength value for the drive lines may be a weighting of one if its associated drive line is outside of the location on the capacitive touch matrix adjacent which a second touch type is expected to occur, and a weighting of zero if its associated drive line is inside of the location on the capacitive touch matrix adjacent which the second touch type is expected to occur.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
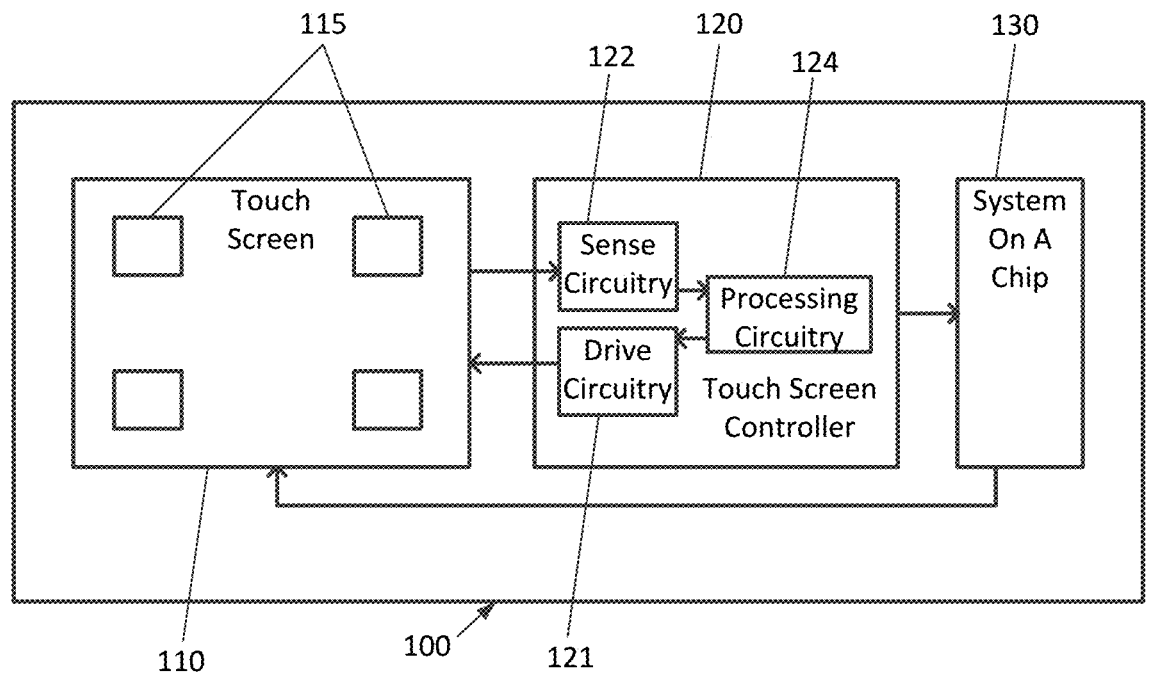
FIG. 1 is a block diagram of a touch screen device such as may be used for performing the functions described herein.

FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch screen display 110, coupled to a touch screen controller 120. The touch screen display 110 is designed to receive touch inputs from a user through a user's fingers or a stylus.

Figure 2:
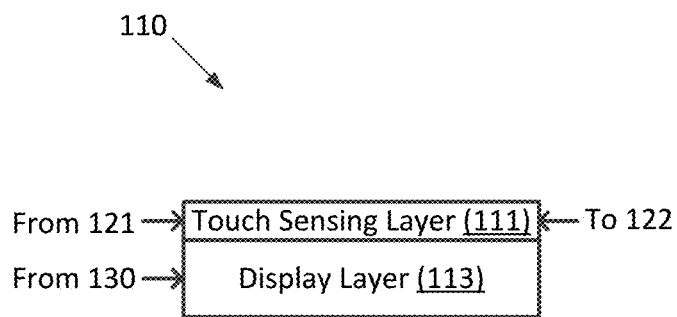
FIG. 2 is a block diagram of the touch screen of the touch screen device of FIG. 1.

The touch screen display 110 includes a display layer 113 and a touch sensing layer 111 (shown in FIG. 2). The touch sensing layer 111 is comprised of touch screen sensors 115 that are configured to detect touches (or other input actions such as hover or gesture motions) to the touch screen display 110. As a touch is sensed, the touch screen controller 120 may receive touch signals from the sensors 115 via sense circuitry 122 and analyze the touch signal(s) using processing circuitry 124. This analysis produces coordinates of the received touch. These coordinates may then be used by a system on a chip (SOC) 130 to manipulate operations with respect to applications and programs executing on the touch screen device 100.

It is noted that the same sensors 115 are capable of being used for both self-capacitance sensing and mutual capacitance sensing, and that therefore both the sense circuitry 122 and the processing circuitry 124 are likewise capable of operating in both self-capacitance sensing and mutual sensing modes.

Figure 3:
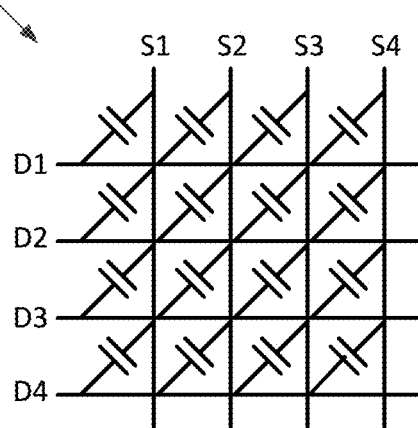
FIG. 3 is the capacitive touch matrix of the touch screen of FIGS. 1-2 represented generally.

As shown in FIG. 3, patterned lines, namely conductive rows (sense lines S1-S4) and columns (drive lines D1-D4), are formed in the touch sensing layer 111. The intersections of the columns and rows form the individual capacitive touch sensors 115 during mutual capacitance touch sensing, and the processing circuitry 124 scans these touch sensors and processes the generated signals to identify the location and type of a touch point or points. Thus, the touch screen display 110 may be considered as producing a touch map having XY coordinates wherein several touch regions (as defined by a set of XY coordinates) of possible touch information may be generated based on one or more touches to the touch screen display 110. The coordinates generated above are XY coordinates identifying the location of the touch on the touch screen display 110.

Figure 4:
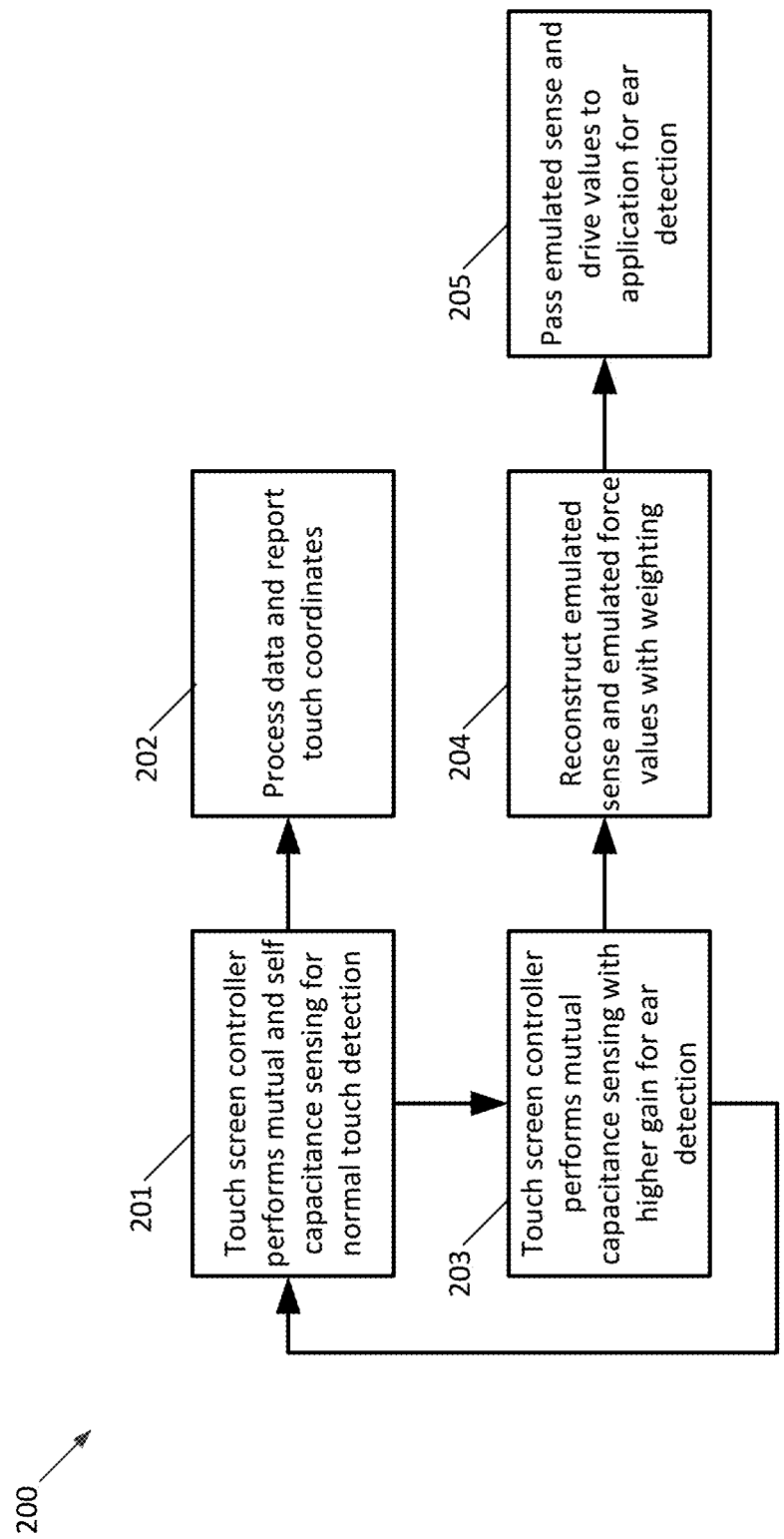
FIG. 4 is a flowchart showing operation of the touch screen device of FIG. 1 when performing the functions described herein.

Note that although the sense lines S1-S4 and drive lines D1-D4 are depicted in FIG. 4 as being straight conductive lines orthogonal to one another, in actuality they may take any shape.

In the mutual capacitance sensing mode, a drive signal is applied to the drive lines D1-D4 by drive circuitry 121, and capacitance values are measured at the sense lines S1-S4 by the sense circuitry 122. Since bringing a finger or conductive stylus near the surface of the sensor changes the local electric field, this causes a reduction in the mutual capacitance between the drive lines and the sense lines, and the capacitance change at every individual point on the grid can be measured to accurately determine the touch location. Therefore, the output of mutual capacitance sensing is a two-dimensional matrix of values, with one value for each intersection between conductive lines. Thus, it can be appreciated that mutual capacitance sensing allows multi-touch operation where multiple fingers, palms or styli can be accurately tracked at the same time.

Operation of the touch screen display 110 and touch screen controller 120 when performing touch sensing, including ear detection, is now described with additional reference to FIG. 4. The touch screen controller 120 switches between performing normal touch detection using mutual and/or self capacitance sensing (Block 201), and operating solely in mutual capacitance sensing mode with an increased gain so as to perform ear detection (Block 203).

When performing normal touch detection using mutual and/or self capacitance sensing (Block 201), the touch screen controller 120 processes the collected touch strength values to determine the coordinates of the touch, and then reports the touch coordinates to the SOC 130.

When performing ear detection (Block 203), the touch screen controller 120 acquires touch strength values from the touch screen display 110 solely using mutual capacitance sensing, and then generates sense line and drive line strength values (Block 204), referred to a emulated self capacitance values, that emulate what those values would be if they had instead been acquired using self capacitance sensing. Note that the emulated self capacitance values (referred to below as emulated sense values and emulated drive values) are not acquired or obtained using self capacitance sensing, and are not determined from any touch strength values acquired using self capacitance sensing. Instead, the emulated self capacitance values are calculated (not acquired), and this calculation is performed solely and exclusively using touch strength values acquired using mutual capacitance sensing.

Figure 5:
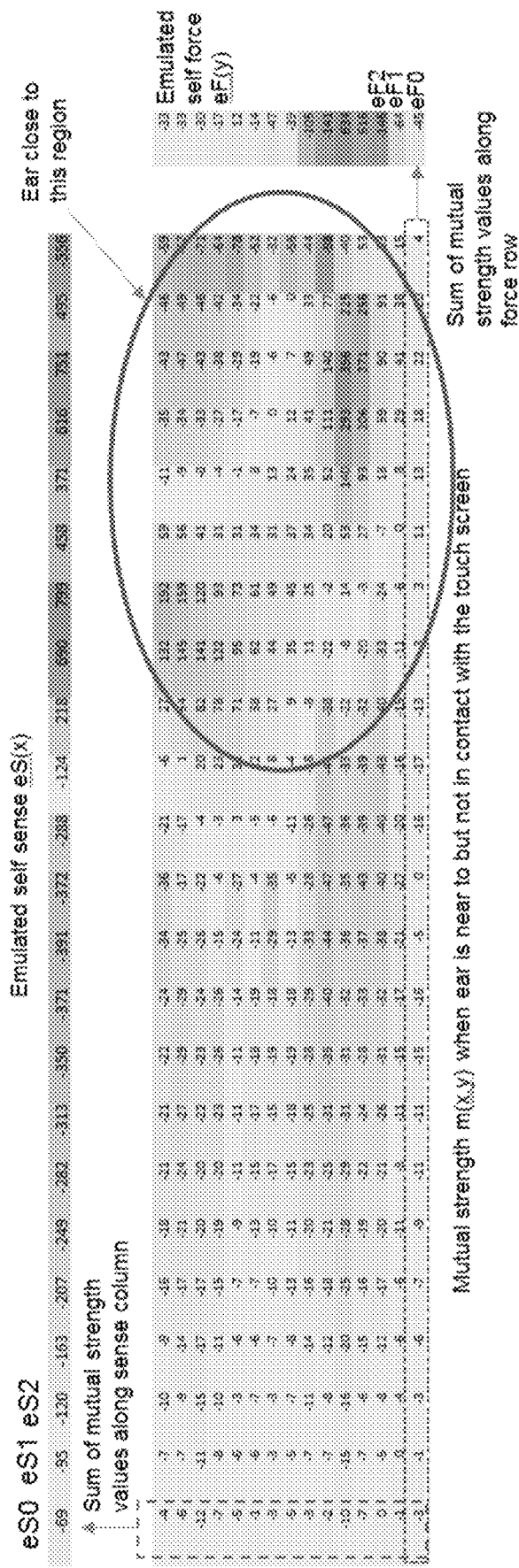
FIG. 5 is a chart showing touch strength values collected using mutual capacitance sensing as summed and used to emulate touch strength values collected using self capacitance sensing, so as to permit ear detection.

This is now described in greater detail with reference to FIGS. 5-6, which shows a sample set of touch strength values acquired using mutual capacitance sensing. To produce the emulated sense line and drive line strength values, the touch screen controller 120 sums each column of touch strength values that were acquired using mutual capacitance sensing to produce a single and exclusive emulated self capacitance touch strength value for that column, and sums each row of touch strength values that were acquired using mutual capacitance sensing to produce a single and exclusive emulated self capacitance touch strength value for that row. In the illustrated example of the touch sensing layer 111 shown in FIG. 3, note that the rows are driven while the columns are sensed during mutual capacitance sensing, so the single emulated self capacitance touch strength value for each column can, as shorthand, be referred to as an emulated "sense" value, while the single emulated self capacitance touch strength value for each row can, as shorthand, be referred to as an emulated "drive" value.

When a user uses a smartphone to place a voice call, the user typically places his ear near to the speaker, which is typically located toward the "top" of the front side of the smartphone. For this reason, prior art smartphones that use proximity sensors to detect a user's ear place those proximity sensors near the top of the front side of the smartphone, and then turn off the touch screen while the user's ear is in proximity. Due to the use of a proximity sensor to perform this proximity sensing, such prior art smartphones may completely turn off touch sensing when the user's ear is detected.

To address the above, when the touch screen controller 120 operates to perform ear detection, the emulated sense values are weighted, with higher weights being applied to the emulated sense values corresponding to sense lines near the top of the front side of the smart phone, and lesser weights being applied to the emulated sense values corresponding to sense lines farther from the top of the front side of the smart phone. In some cases, the emulated drive values are also weighted, with higher weights being applied to the emulated drive values corresponding to drive lines farther from the edges of the touch screen display 110, and lesser weights being applied to the emulated drive values corresponding to drive lines closer to the edges of the touch screen display 110. This weighting may be performed to remove the effects of the user's hand (holding the smartphone) on touch sensing. Weighting may also be applied to emphasize the touch strength values in region on the touch screen display 110 adjacent to which the user is expected to place their ear, thereby effectively increasing the gain of those touch strength values.

Figure 6:
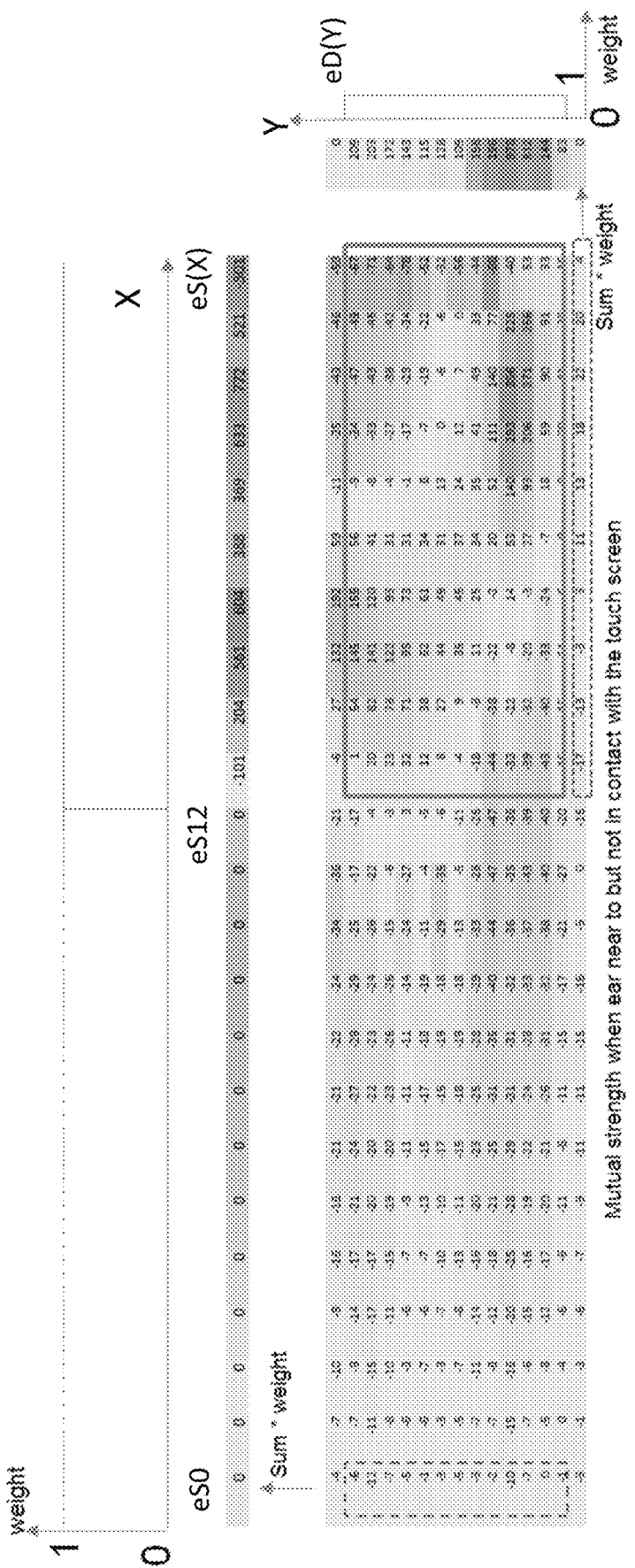
FIG. 6 is a chart showing touch strength values collected using mutual capacitance sensing as summed and weighted to be used to emulate touch strength values collected using self capacitance sensing, so as to permit ear detection.

An example of this weighting can be seen in FIG. 6, where the bottom leftmost touch strength value can be referred to as having the coordinates (0,0), and where the top rightmost touch strength value can be referred to as having the coordinates (X,Y). Therefore, note that from left to right, the columns (sense lines) are numbered from 0 to X, and that from bottom to top, the rows (drive lines) are numbered from 0 to Y.

For simplicity of explanation here, instead of progressive weighting, weights of either 0 or 1 are applied to the various emulated drive and sense values. In particular, a weight of 0 is applied to emulated drive values in rows 0 and Y to cancel out the effects of the user's hand on the touch screen 110, and a weight of 0 is applied to emulated sense values in columns 0 to 12 to emphasize the touch strength values in the region on the touch screen display 110 adjacent to which the user is expected to place their ear. A weight of 1 is applied to the other emulated drive values and emulated sense values. Therefore, reviewing the area of the chart of FIG. 5 labeled as "Ear close to this region", it can be seen that in the chart of FIG. 6, the corresponding sense and drive lines have had the weight of 1 applied thereto, while the other sense and drive lines have had the weight of 0 applied thereto.

It should be appreciated that there may be multiple levels and types of weighting applies. For example, a first weighting scheme may be applied to emulated sense values and emulated drive values associated with areas of the touch screen 110 where the user is expected to place their hand (grasp the smartphone) while performing a voice call, such as by applying a weight of 0 to those emulated sense values and emulated drive values, and a second weighting scheme (such as a progressive weighting) may be applied to emulated sense values and emulated drive values associated with an area of the touch screen 110 where the user is expected to place their ear while performing a voice call.

Therefore, understand that overall, the goal of the weighting is to emphasize the emulated sense values and emulated drive values associated with the area of the touch screen 110 where the user is expected to place their ear while performing a voice call, while removing or deemphasizing emulated sense values and emulated drive values outside of this area.

Mathematically, the calculation of the emulated sense values from the touch strength values obtained using mutual capacitance sensing can be calculated as:

$$eS(x) = w(x) * \Sigma_{x=X, y=0}^{x=X, y=Max(y)} m(x,y)$$

where w(x) is the weight to be applied to that emulated sense value (which, as explained, is based upon which sense line that emulated sense value represents), and where m(x,y) represents the touch strength values obtained using mutual capacitance sensing.

Similarly, mathematically, the calculation of the emulated drive values from the touch strength values obtained using mutual capacitance sensing can be calculated as:

$$eF(yx) = w(y) \Sigma_{x=0, y=Y}^{x=Max(x), y=Y} m(x,y)$$

where w(x,y) is the weight to be applied to that emulated drive value (which, as explained, is based upon which drive line that emulated drive value represents), and where m(x,y) represents the touch strength values obtained using mutual capacitance sensing.

Once each emulated sense value (one per sense line) and once each emulated drive value (one per drive line) has been calculated by the touch screen controller 120, then (referring back to FIG. 4), the touch screen controller 120 passes the emulated sense and drive values to an application executed either via the processing circuitry 124 or the SOC 130 that performs the actual ear detection on the emulated sense and emulated drive values (Block 205). Based on detection of the user's ear, the SOC 103 can, for example, turn off the touch screen so that the user's ear does not cause inadvertent user input while the user is conducting a voice call.

The techniques described above for calculating the emulated sense values and emulated drive values are advantageous because the emulated values have similar characteristics as touch strength values acquired using self capacitance sensing, but are calculated using touch strength values acquired using mutual capacitance sensing, which has a greater signal to noise ratio than touch strength values acquired using self capacitance sensing in a thin touch screen display 110, such as a Youm On-Cell Touch AMOLED display (Y-OCTA).

Those of skill in the art will appreciate that, despite the techniques above being described with respect to performing ear detection, the emulated sense values and emulated drive values can be used for performing any sort of proximity detection (for example, for performing hover detection).

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A touch screen controller, comprising:
processing circuitry configured to:
perform mutual capacitance sensing to acquire touch strength values from a capacitive touch matrix formed by capacitively intersecting conductive lines;
for each conductive line, generate an emulated self capacitance value from a touch strength value associated with said conductive line based upon a position of that conductive line compared to a location on the capacitive touch matrix adjacent to which a first touch type is expected to occur; and
determine presence of the first touch type adjacent to the capacitive touch matrix based upon the emulated self capacitance values.

2. The touch screen controller of claim 1, wherein the processing circuitry is configured to generate the emulated self capacitance value for each conductive line by weighting the associated touch strength value based upon closeness of said conductive line to the location on the capacitive touch matrix adjacent to which the first touch type is expected to occur.

3. The touch screen controller of claim 2, wherein the weighting applied to each associated touch strength value is a weighting of zero if its associated conductive line is outside of the location on the capacitive touch matrix adjacent to which the first touch type is expected to occur, and a weighting of one if its associated conductive line is inside of the location on the capacitive touch matrix adjacent to which the first touch type is expected to occur.

4. The touch screen controller of claim 2, wherein the weighting applied to each associated touch strength value is a weighting of one if its associated conductive line is outside of the location on the capacitive touch matrix adjacent to which a second touch type is expected to occur, and a weighting of zero if its associated conductive line is inside of the location on the capacitive touch matrix adjacent to which the first touch type is expected to occur, wherein the second touch type is different than the first touch type.

5. The touch screen controller of claim 4, wherein the first touch type is a touch by a portion of a user's head; and wherein the second touch type is a touch by a portion of a user's hand.

6. The touch screen controller of claim 1,
wherein the capacitively intersecting conductive lines comprise capacitively intersecting drive lines and sense lines;

wherein the processing circuitry is configured to generate the emulated self capacitance value for each conductive line by:
for each sense line, generating an emulated self capacitance sense value based upon a position of that sense line compared to the location on the capacitive touch matrix adjacent to which the first touch type is expected to occur; and
for each drive line, generating an emulated self capacitance drive value based upon a position of that drive line compared to the location on the capacitive touch matrix adjacent to which the first touch type is expected to occur; and
wherein the processing circuitry is configured to determine the presence of the first touch type adjacent to the capacitive touch matrix based upon the emulated self capacitance sense values and emulated self capacitance drive values.

7. The touch screen controller of claim 6,
wherein the processing circuitry is configured to generate the emulated self capacitance sense values by acquiring touch strength values for the sense lines and weighting those touch strength values based on closeness of their associated sense lines to the location on the capacitive touch matrix adjacent to which the first touch type is expected to occur; and
wherein the processing circuitry is configured to generate the emulated self capacitance drive values by acquiring touch strength values for the drive lines and weighting those touch strength values based on closeness of their associated drive lines to the location on the capacitive touch matrix adjacent to which the first touch type is expected to occur.

8. The touch screen controller of claim 7, wherein the weighting applied to each touch strength value for the sense lines is a weighting of zero if its associated sense line is outside of the location on the capacitive touch matrix adjacent to which the first touch type is expected to occur, and a weighting of one if its associated sense line is inside of the location on the capacitive touch matrix adjacent to which the first touch type is expected to occur.

9. The touch screen controller of claim 7, wherein the weighting applied to each touch strength value for the drive lines is a weighting of zero if its associated drive line is outside of the location on the capacitive touch matrix adjacent to which the first touch type is expected to occur, and a weighting of one if its associated drive line is inside of the location on the capacitive touch matrix adjacent to which the first touch type is expected to occur.

10. The touch screen controller of claim 7, wherein the weighting applied to each touch strength value for the sense lines is a weighting of one if its associated sense line is outside of the location on the capacitive touch matrix adjacent to which a second touch type is expected to occur, and a weighting of zero if its associated sense line is inside of the location on the capacitive touch matrix adjacent to which the second touch type is expected to occur.

11. The touch screen controller of claim 7, wherein the weighting applied to each touch strength value for the drive lines is a weighting of one if its associated drive line is outside of the location on the capacitive touch matrix adjacent to which a second touch type is expected to occur, and a weighting of zero if its associated drive line is inside of the location on the capacitive touch matrix adjacent to which the second touch type is expected to occur.

12. A method, comprising:
acquiring touch strength values from a capacitive touch matrix formed by capacitively intersecting conductive lines, using mutual capacitance sensing;
for each conductive line, generating an emulated self capacitance value from a touch strength value associated with said conductive line based upon a position of that conductive line compared to a location on the capacitive touch matrix adjacent to which a first touch type is expected to occur; and
determining presence of a touch adjacent to the capacitive touch matrix based upon the emulated self capacitance values.

13. The method of claim 12, wherein the emulated self capacitance value is generated for each conductive line by weighting the associated touch strength value based upon closeness of said conductive line to the location on the capacitive touch matrix adjacent to which the first touch type is expected to occur.

14. The method of claim 13, wherein the weighting applied to each touch strength value is a weighting of zero if its associated conductive line is outside of the location on the capacitive touch matrix adjacent to which the first touch type is expected to occur, and a weighting of one if its associated conductive line is inside of the location on the capacitive touch matrix adjacent to which the first touch type is expected to occur.

15. The method of claim 13, wherein the weighting applied to each touch strength value is a weighting of one if its associated conductive line is outside of the location on the capacitive touch matrix adjacent to which a second touch type is expected to occur, and a weighting of zero if its associated conductive line is inside of the location on the capacitive touch matrix adjacent to which the first touch type is expected to occur, wherein the second touch type is different than the first touch type.

16. A method, comprising:
acquiring touch strength values from a capacitive touch matrix formed by capacitive intersecting drive lines and sense lines;
for each sense line, generating an emulated self capacitance sense value from a touch strength value associated with said sense line based upon a position of that sense line compared to a location on the capacitive touch matrix adjacent to which a first touch type is expected to occur;
for each drive line, generating an emulated self capacitance drive value from a touch strength value associated with said drive line based upon a position of that drive line compared to the location on the capacitive touch matrix adjacent to which the first touch type is expected to occur; and
determining presence of the first touch type adjacent to the capacitive touch matrix based upon the emulated self capacitance sense values and emulated self capacitance drive values.

17. The method of claim 16,
wherein the emulated self capacitance sense values are generated by weighting the associated touch strength values based on their closeness to the location on the capacitive touch matrix adjacent to which the first touch type is expected to occur; and
wherein the emulated self capacitance drive values are generated by weighting the associated touch strength values based on their closeness to the location on the capacitive touch matrix adjacent to which the first touch type is expected to occur.

18. The method of claim 17, wherein the weighting applied to a given touch strength value is a weighting of zero if its associated sense line is outside of the location on the capacitive touch matrix adjacent to which the first touch type is expected to occur, and a weighting of one if its associated sense line is inside of the location on the capacitive touch matrix adjacent to which the first touch type is expected to occur.

19. The method of claim 17, wherein the weighting applied to a given touch strength value is a weighting of zero if its associated drive line is outside of the location on the capacitive touch matrix adjacent to which the first touch type is expected to occur, and a weighting of one if its associated drive line is inside of the location on the capacitive touch matrix adjacent to which the first touch type is expected to occur.

20. The method of claim 17, wherein the weighting applied to a given touch strength value is a weighting of one if its associated sense line is outside of the location on the capacitive touch matrix adjacent to which a second touch type is expected to occur, and a weighting of zero if its associated sense line is inside of the location on the capacitive touch matrix adjacent to which the second touch type is expected to occur.

21. The method of claim 17, wherein the weighting applied to a given touch strength value is a weighting of one if its associated drive line is outside of the location on the capacitive touch matrix adjacent to which a second touch type is expected to occur, and a weighting of zero if its associated drive line is inside of the location on the capacitive touch matrix adjacent to which the second touch type is expected to occur.

\* \* \* \* \*